United States Patent
DaSilva

(10) Patent No.: US 7,669,913 B2
(45) Date of Patent: Mar. 2, 2010

(54) PROTECTIVE COVER FOR A MOTOR VEHICLE

(76) Inventor: Eliseo DaSilva, 120 Kane St., Apartment D7, West Hartford, CT (US) 06119

( * ) Notice: Subject to any disclaimer, the term of this patent is extended or adjusted under 35 U.S.C. 154(b) by 437 days.

(21) Appl. No.: 11/521,284

(22) Filed: Sep. 13, 2006

(65) Prior Publication Data
US 2007/0007792 A1    Jan. 11, 2007

Related U.S. Application Data

(60) Provisional application No. 60/717,008, filed on Sep. 13, 2005.

(30) Foreign Application Priority Data
Mar. 18, 2005    (BR) .................................... 0501023

(51) Int. Cl.
    *B60J 11/04*    (2006.01)
(52) U.S. Cl. .......................... 296/136.07; 296/136.01; 296/136.1
(58) Field of Classification Search ............ 296/136.01, 296/136.02, 136.07, 136.1, 136.11, 136.12
    See application file for complete search history.

(56) References Cited

U.S. PATENT DOCUMENTS

| | | | |
|---|---|---|---|
| 1,728,437 A * | 9/1929 | Mott ........................... | 150/166 |
| 4,209,197 A * | 6/1980 | Fischer .................. | 296/136.11 |
| 4,850,635 A | 7/1989 | Lindell | |
| 4,867,216 A | 9/1989 | McKee | |
| 4,903,749 A | 2/1990 | Hanania | |
| 4,925,234 A | 5/1990 | Park et al. | |
| 4,940,276 A | 7/1990 | Madison | |
| 5,029,933 A | 7/1991 | Gillem | |
| 5,275,460 A | 1/1994 | Kraus | |
| 5,328,230 A | 7/1994 | Curchod | |
| 5,401,074 A | 3/1995 | Timmerman | |
| 5,413,396 A | 5/1995 | Poznansky et al. | |
| 5,435,362 A | 7/1995 | Chiang | |
| D364,846 S | 12/1995 | Kelsey et al. | |
| 5,476,127 A | 12/1995 | Fournier | |

(Continued)

OTHER PUBLICATIONS

International Search Report and Written Opinion dated Aug. 31, 2007.

(Continued)

*Primary Examiner*—Lori L Lyjak
(74) *Attorney, Agent, or Firm*—Michaud-Kinney Group LLP

(57) ABSTRACT

A protective cover for covering at least a portion of an external surface of a motor vehicle, the protective cover includes a first segment comprising a pliable material configured to cover at least a portion of a first external surface of the motor vehicle. The first external surface is disposed substantially on a first side of a reference plane centrally positioned between two opposing lateral sides of the motor vehicle and extending between a front end and a rear end of the motor vehicle. The protective cover further includes a second segment comprising a pliable material configured to cover at least a portion of a second external surface of the motor vehicle, wherein the second external surface is disposed substantially on a second side of the reference plane and extends between the front end and the rear end of the motor vehicle. The first and second segments are positioned adjacent to one another on opposing sides of the reference plane.

18 Claims, 12 Drawing Sheets

U.S. PATENT DOCUMENTS

| | | | |
|---|---|---|---|
| 5,490,707 | A | 2/1996 | De La Cruz |
| 5,497,819 | A | 3/1996 | Chiang |
| 5,597,196 | A | 1/1997 | Gibbs |
| 5,597,197 | A | 1/1997 | Mowar et al. |
| D396,843 | S | 8/1998 | Mifsud |
| 5,791,361 | A | 8/1998 | Chong |
| 6,273,493 | B1 | 8/2001 | Woo |
| 6,318,393 | B1 | 11/2001 | Glasgo |
| 6,340,198 | B1 | 1/2002 | Benites et al. |
| 6,641,203 | B1 | 11/2003 | Everett |
| 6,705,337 | B1 | 3/2004 | Peckham |
| 6,779,827 | B2 | 8/2004 | Clark |

OTHER PUBLICATIONS

Autosunproof, The Easy Car Cover, http://www.inventism.com/auto-sun-proof.html, 3 pages.

California POP TOP, http://www.capoptop.com, two pages.

Smart Cover, http://www.mockingbirdinc.com/smartcover/ScIndex.html#terms, 5 pages.

Car cover Manufacturers & Suppliers, www.globalsources.com/gsol/I/Car-cover/p/2000000003844/3000000154662/sm/1001356164.htm, 4 pages.

All Weather Car Cover, http://www.shop.edirectory.co.uk/sales_and_marketing/1911/mia/d/all+weather+car+cover+half/pid/3572477, 2 pages.

Waterproof Half Covers, http://www.vertar.com/prodtype.asp?pt_id=131, 3 pages.

\* cited by examiner

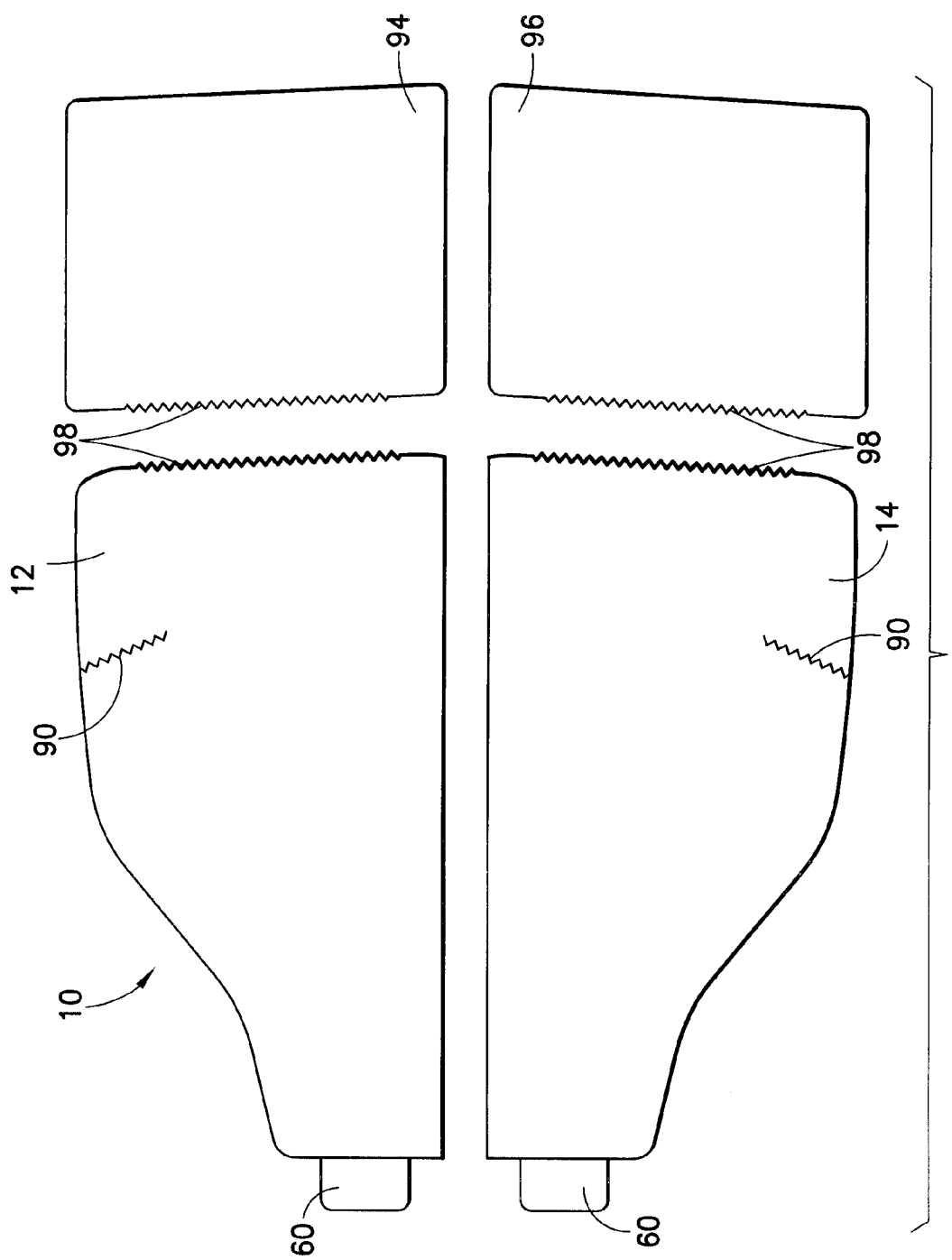

PROTECTIVE COVER FOR A MOTOR VEHICLE

This application claims priority from U.S. provisional application serial No. 60/717,008, filed Sep. 13, 2005, which claims priority from Brazilian Patent Application No. PI0501023-3, the disclosure of which is incorporated by reference herein, in their entirety.

FIELD OF THE INVENTION

The present invention is generally directed to a protective cover for a motor vehicle and in particular to a cover comprising at least two longitudinally extending segments.

BACKGROUND OF THE INVENTION

Motor vehicles including automobiles, sport utility vehicles, vans and pick-up trucks can be subject to a wide range of environmental conditions when parked or stored. For example, motor vehicles left in the sun can cause the seats, the steering wheel, the exterior paint and other surfaces to over heat thereby increasing the potential for degradation. Such sun baked surfaces can also become too hot to touch. In addition, the exterior surface of motor vehicles can become covered with snow, ice, leaves, dust, debris and other substances. Driving a motor vehicle that is covered with ice or snow, for example, can be dangerous or impractical. Some states have motor vehicle laws which prohibit motorists from driving with snow accumulated on top of the vehicle, so as not to become dislodged and fall onto oncoming vehicles. In certain climates and weather conditions, frost can form on windshields, windows and external mirrors when the motor vehicle is parked outside overnight. Motorists are therefore generally obligated to remove snow, ice and other debris in order to safely operate the motor vehicle. Removal of ice and snow, in particular, can be a time consuming and arduous task. For instance, removal of snow from hard to reach areas, such as the roof, of a motor vehicle can cause the motorist to become covered with snow. Moreover, the removal process tends to be more difficult in freezing cold weather and when it is snowing. The removal process can involve scraping or sweeping which can scratch windows, windshields, and painted surfaces. In addition, snow and ice can build up inside door locks and around windows and render them inoperable.

In order to protect motor vehicles from harsh environmental conditions such as snow, ice, and heat from the sun, motorists have covered their vehicles with various covering devices. For example, one-piece covers which envelop the entire motor vehicle have been used. Such covers are likely custom made to fit a particular vehicle and as a result can be rather expensive. Such expensive covers can be a target for thieves. Moreover, one-piece covers can be time consuming, cumbersome or inconvenient to install and remove, even without snow accumulated on them. For example, because of the size and shape of a one piece cover, wind can fill the cover much like a sail and blow the cover off before it can be secured. One piece covers can become even more difficult to remove when covered with snow because of the weight of the snow. For instance, a one piece cover can be peeled off the motor vehicle from one end of the motor vehicle to the other. However, when peeling off a one-piece cover coated with snow, much of the snow accumulated on the cover gets dumped back on another portion of the cover rather than removing the snow from the motor vehicle.

The bulkiness of one-piece covers can make them difficult to maneuver and as such can be dropped or dragged in mud while being removed. Moreover, the bulk of a one piece cover makes it difficult to store and an entire trunk of a motor vehicle may be consumed for storage of such a cover. One piece covers which envelop less than the entire vehicle may reduce the bulk but do not solve the problem stated above regarding removal when the cover is coated with snow.

Means of securing protective covers to motor vehicles have typically used of a plurality of fasteners. It can become time consuming to secure such a plurality of fasteners to various portions of a motor vehicle. One-piece covers have used an elastic material disposed around a peripheral edge of the cover to hold the cover in place. However, the elastic material can cause the peripheral edge of the cover to contract to a size smaller than the circumference of the motor vehicle when the cover is not installed. This requires the elastic to be stretched out over the motor vehicle during installation. Such a stretching action can be awkward and several attempts may be required to properly install the cover. Other covers use a strap which extends from one side of the cover, under the motor vehicle to the other side of the cover. Installation of such a cover would likely require the motorist to squat down to reach under the motor vehicle.

There is a need to provide a protective cover for motor vehicles which can more effectively be installed and removed; which is adjustable for use on motor vehicles of various sizes and which can be more effectively secured on the motor vehicle. Prior art methods and systems for addressing these needs were either too expensive, inefficient, or ineffective or a combination of all of these. Based on the foregoing, it is the general object of the present invention to improve upon or overcome the problems and drawbacks of the prior art.

SUMMARY OF THE INVENTION

According to one aspect of the present invention a protective cover for covering at least a portion of an external surface of a motor vehicle is provided. The protective cover includes a first segment comprising a pliable material configured to cover at least a portion of a first external surface of the motor vehicle. The first external surface is disposed substantially on a first side of a reference plane centrally positioned between two opposing lateral sides of the motor vehicle and extending between a front end and a rear end of the motor vehicle. The protective cover further includes a second segment comprising a pliable material configured to cover at least a portion of a second external surface of the motor vehicle, wherein the second external surface is disposed substantially on a second side of the reference plane and extending between the front end and the rear end of the motor vehicle. The first and second segments are positioned adjacent to one another on opposing sides of the reference plane.

In another aspect of the present invention, a the first segment comprises at least one hood-end connector projecting from a hood-end of the first segment towards a first diametrically opposing hood quadrant and the second segment comprises at least one hood-end connector projecting from the hood-end of said second segment towards a second diametrically opposing hood quadrant.

In yet another aspect of the present invention the first and second segments each include a trunk flap extending therefrom. The trunk flaps include at least one trunk-end connector comprised of one part of a hook and loop type fastener (e.g., Velcro®), preferably the hook part, affixed thereto. Preferably an internal surface defining a cavity of a motor vehicle trunk comprises the loop part of the hook and loop type fastener. The trunk flap and the trunk-end connector have a combined thickness such that the trunk panel can be closed unobstructively thereupon.

DESCRIPTION OF THE DRAWINGS

FIG. 19 is a top view of the protective cover of the present invention illustrating a plurality of segments.

DETAILED DESCRIPTION OF THE PREFERRED EMBODIMENT

Figure 1:
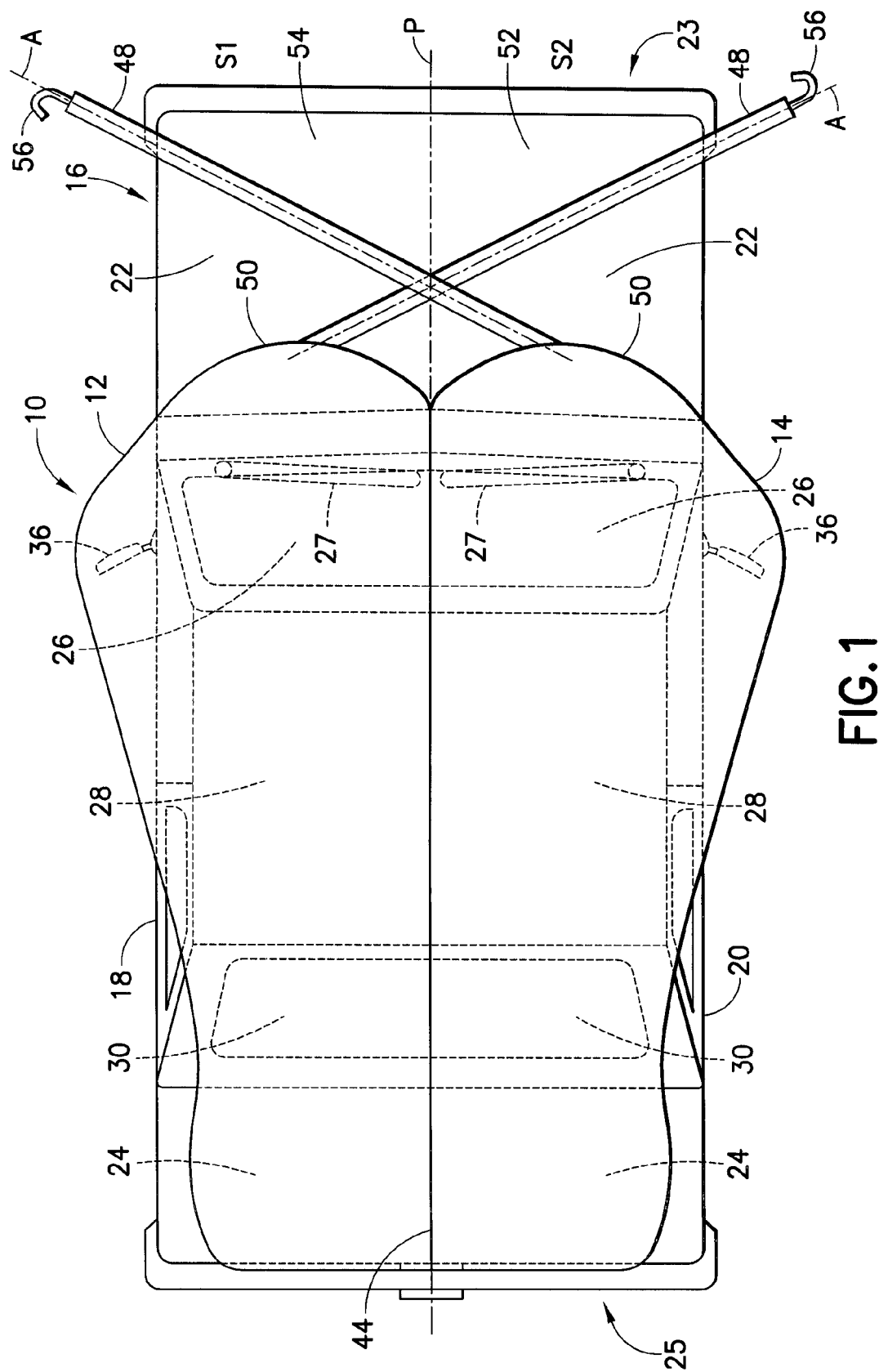
FIG. 1 is a top view of the protective cover of the present invention installed on a motor vehicle.

Referring to FIG. 1, a two piece protective cover 10 includes a first segment 12 and a second segment 14 each comprising a pliable material configured to cover at least a portion of an external surface of motor vehicle 16. The present invention can be adapted for motor vehicles of any shape or design including sedans, pick-up trucks, sports utility vehicles and other vehicles. Preferably, the pliable material is waterproof, lightweight and anti-stick. Preferably, the pliable material is waterproof, lightweight and anti-stick. In particular, the protective cover is preferably manufactured from a material resistant to ice adhering thereto. Suitable materials from which the protective cover can be fabricated include, but are not limited to, polyurethane, vinyl, plastic, nylon or a combination thereof. Manufacture of the cover can be simplified since each of the segments can be made as mirror images of each other.

The first segment 12 is configured to cover at least a portion of a first external surface disposed substantially on a first side S1 of a reference plane P centrally positioned between two opposing lateral sides 18, 20 of the motor vehicle 16 and extending generally between a front end 23 and a rear end 25 of the motor vehicle. Similarly, the second segment 12 is configured to cover at least a portion of a second external surface of the motor vehicle 16 disposed substantially on a second side S2 of the reference plane P and extending generally between the front end 23 and the rear end 25. The first segment 12 is configured to cover at least a portion of the first external surface comprising at least portions of a hood 22, a windshield 26, windshield wipers 27, a roof 28, rear glass 30 and a trunk panel 24. Similarly, the second segment 14 is configured to cover at least a portion of the second external surface comprising at least portions of the hood 22, the windshield 26, the roof 28, the rear glass 30 and the trunk panel 24. The protective cover helps decrease the effort required for installation and removal thereof. In particular, each of the segments 12, 14 can be removed in a direction away from the reference plane thereby allowing any snow accumulated thereon to be discard off of the segments and away from the motor vehicle. In addition, since each segment 12, 14 can be removed separately the user would have to exert less effort compared to removing a one piece cover bearing the greater quantity of snow disposed thereon.

Figure 2:
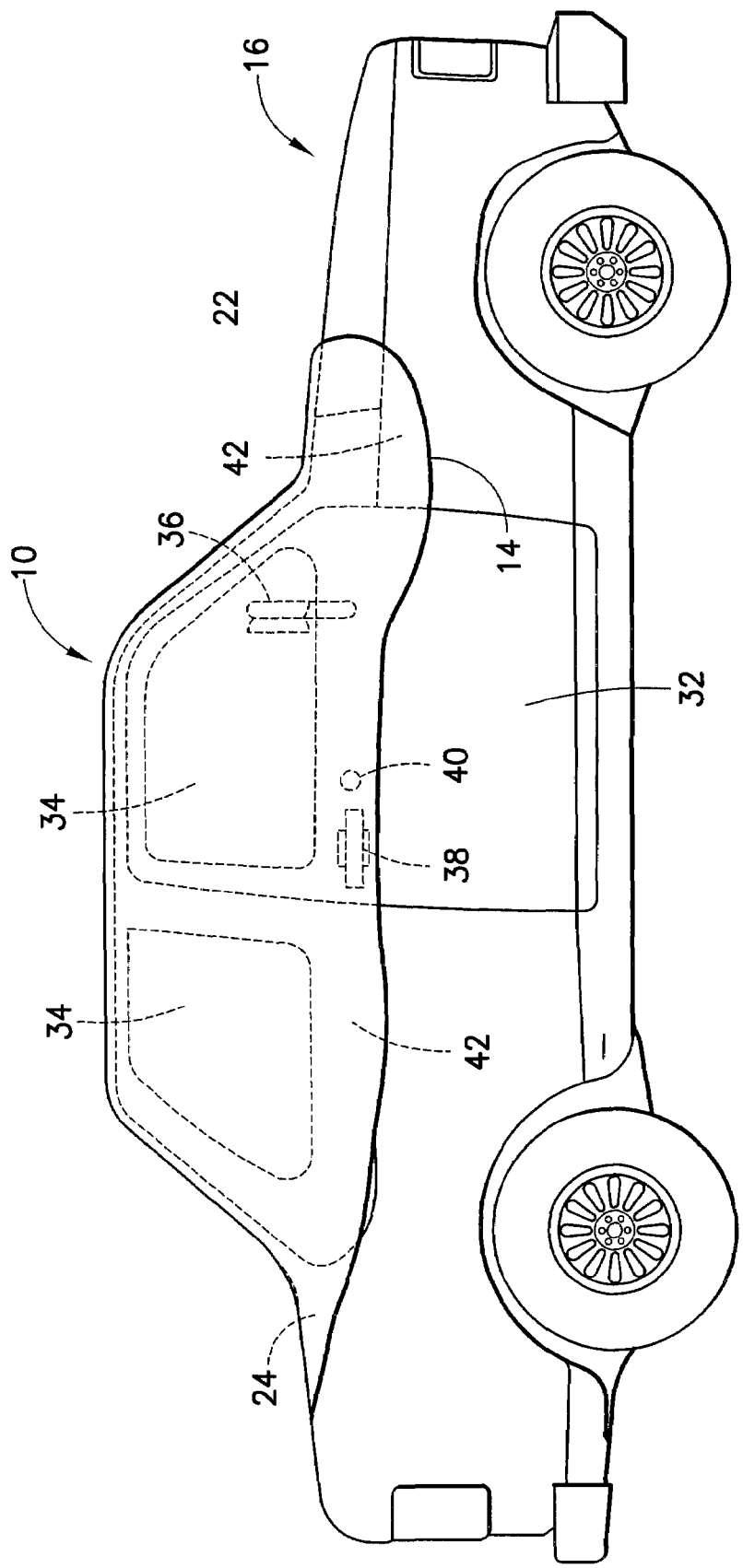
FIG. 2 is side view of the protective cover of the present invention installed on a motor vehicle.

Referring to FIG. 2 the second segment 14 is configured to cover at least a portion of the second external surface further comprising at least a portion of a side door 32, lateral windows 34, side mirror 36, door handle 38, lock 40 and side panels 42. Similarly, the first segment 12 is configured to cover at least a portion of the first external surface further comprising at least a portion of the side door, lateral windows, side mirror, door handle, lock and side panels on an opposing side of the motor vehicle 16. The first and second segments are contoured to generally fit the motor vehicle shape.

Referring again to FIG. 1, the first segment 12 and second segment 14 each have a border 44. The first segment 12 and the second segment 14 are shown positioned on the motor vehicle 16 on opposing sides of the reference plane with the borders 44 aligned substantially adjacent to one another.

Referring to FIG. 1, the first segment 12 comprises at least one hood-end connector 48 projecting from a hood-end 50 of the first segment towards a first diametrically opposing hood quadrant 52 of the motor vehicle 16, when the first segment is installed on the first external surface. The second segment 14 comprises at least one hood-end connector 48 projecting from the hood-end 50 of the second segment towards a second diametrically opposing hood quadrant 54, when the second segment is installed on the second external surface. Preferably, the at least one hood-end connector 48 comprises an elastically deformable material to maintain a tension in the connector thereby securing the segment 12, 14 to the motor vehicle 16. In the embodiment illustrated in FIG. 1, the hood-end connector 48 of the first segment 12 and the hood-end connector of the second segment 14 intersect each other along longitudinal axes A, when the first and second segments are installed on the first and second external surfaces, respectively. By releasably securing the hood-end connectors 48 to diametrically opposing hood quadrants 52, 54, respective segments 12, 14 can be held in position on the windshield 26 and roof 28 and help keep the respective segments engaged with the roof along the border 44. While the hood-end connectors are shown projecting towards a diametrically opposing hood quadrant, the present invention is not limited in this regard as the hood-end connectors can project towards other portions of the motor vehicle including but not limited to opposites sides thereof.

In addition, FIG. 1 illustrates at least one of the hood-end connectors 48 having a releasable hook type fastener 56 affixed to a distal end thereof. While a hook type fastener is illustrated, the present invention is not limited in this regard as other releasable fasteners may be used including but not limited to snaps, hook and loop fasteners, clamps, adhesives and other releasable fasteners.

Figure 3:
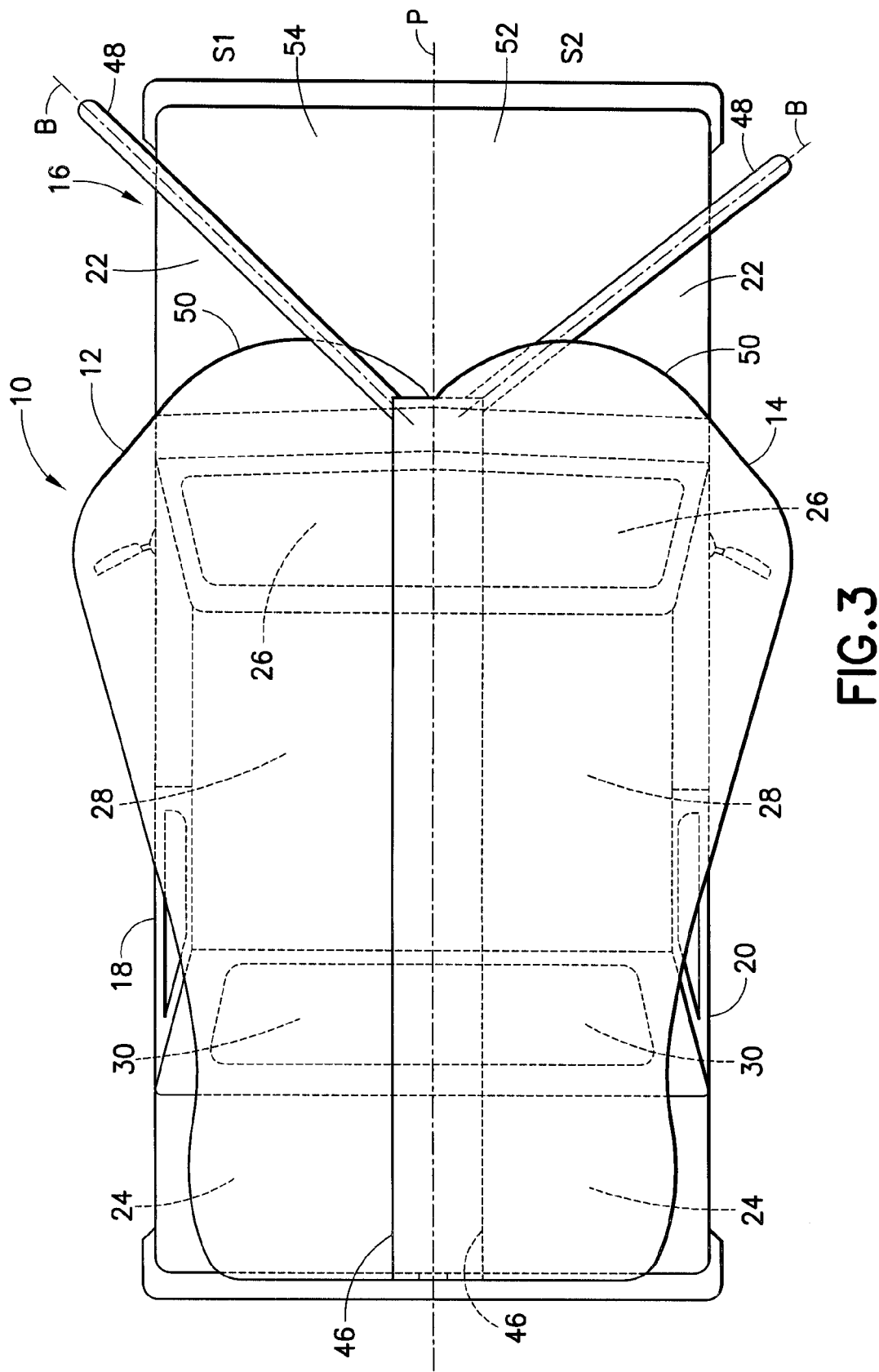
FIG. 3 is a top view of the protective cover with extension flaps, installed on a motor vehicle.
Figure 4:
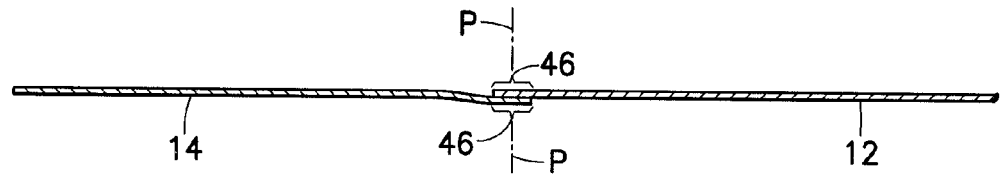
FIG. 4 is a cross sectional view of the overlapped extension flaps.

Referring now to FIGS. 3 and 4, the first segment 12 and the second segment 14 each have an extension flap 46 which overlap each other in an area adjacent to the reference plane P when the first segment and the second segment are positioned on the external surface of the motor vehicle 16. The first segment 12 comprises at least one hood-end connector 48 projecting from the flap 46 portion of the hood-end 50 of the first segment towards a first diametrically opposing hood quadrant 52 of the motor vehicle 16. The second segment 14 comprises at least one hood-end connector 48 projecting from the flap 46 portion the hood-end 50 of the second segment towards a second diametrically opposing hood quadrant 54. In the embodiment illustrated in FIG. 3, the hood-end connector 48 of the first segment 12 and the hood-end connector of the second segment 14 have intersecting longitudinal axes B.

Figure 5:
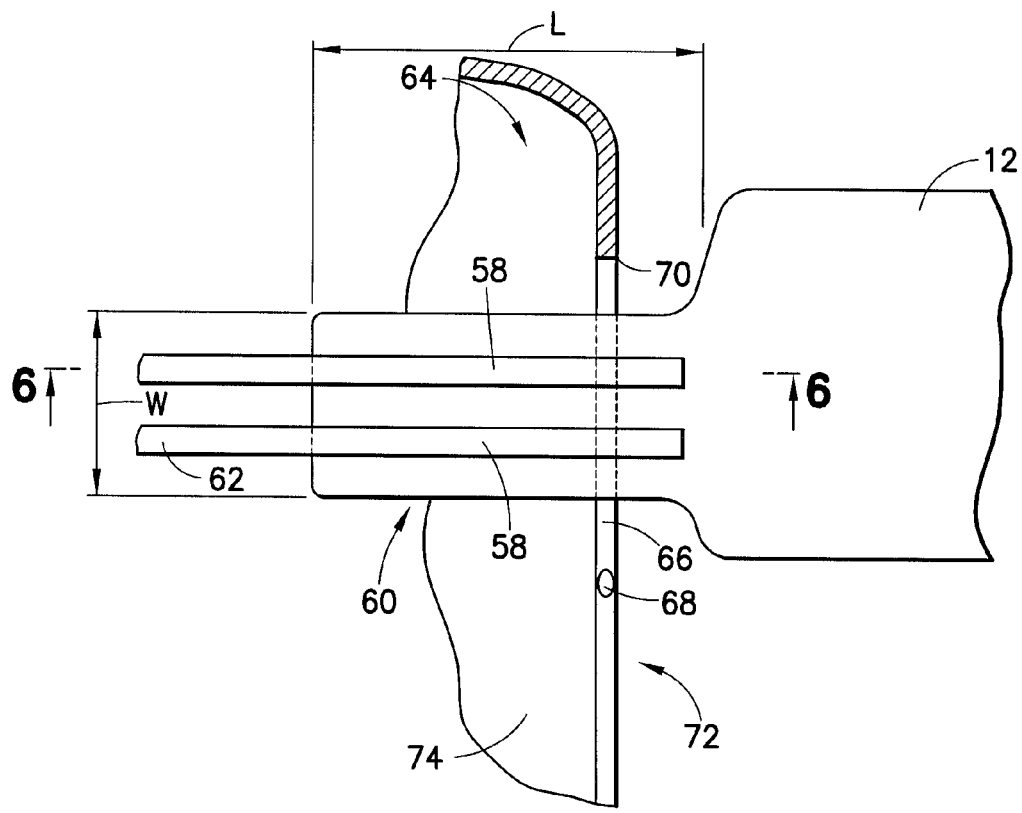
FIG. 5 is a bottom view of the segment shown in reference to the trunk of a motor vehicle.
Figure 6:
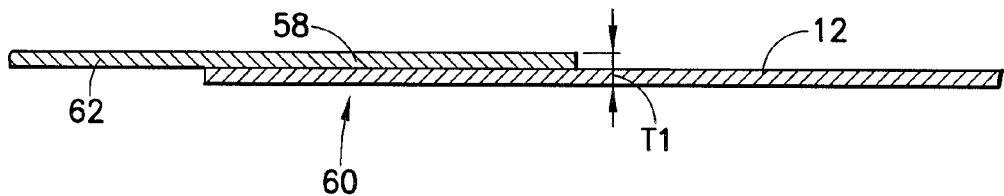
FIG. 6 is a cross sectional view of the portion of the segment illustrated in FIG. 5.
Figure 7:
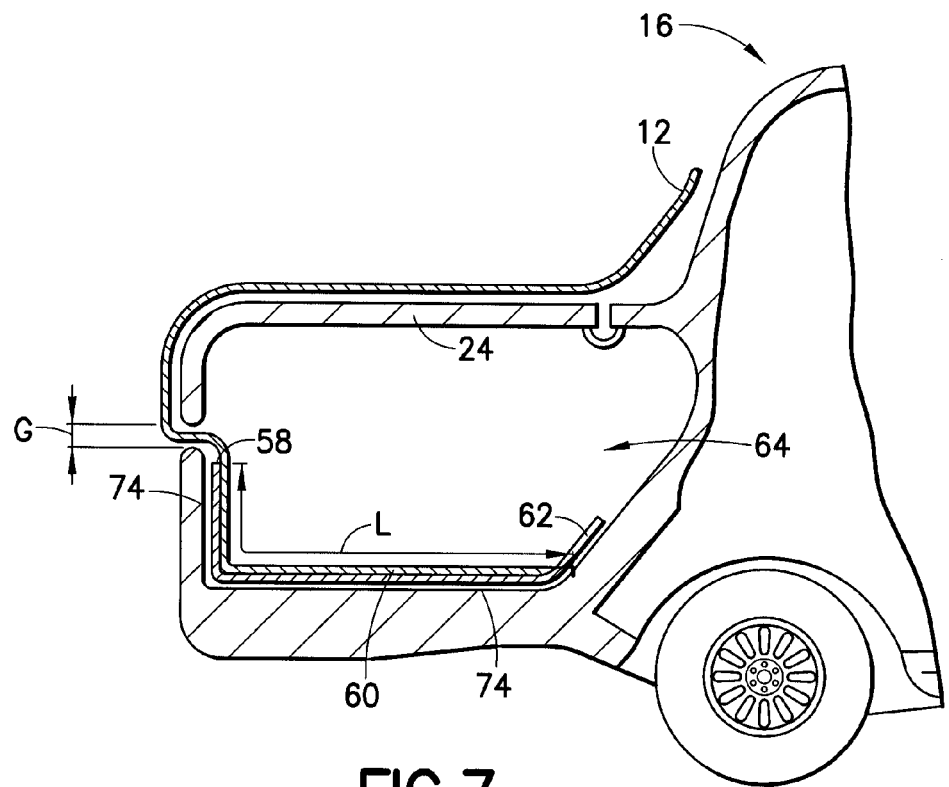
FIG. 7 is a cross sectional view of the segment installed in a retracted position in the trunk of a motor vehicle.

Referring to FIG. 5, at least one of the first segment 12 and the second segment 14 include a trunk flap 60 extending therefrom. The trunk flap 60 includes a reduced width W configured to fit into a trunk cavity 64, over a trunk frame 66 and between a trunk latch 68 and an edge 70 of a trunk opening 72. The trunk flap 60 includes at least one trunk-end connector 58 comprised of one part of a hook and loop type fastener (e.g., Velcro®), preferably the hook part, affixed thereto. Preferably an internal surface 74 defining the inside of the trunk cavity 64 comprises the loop part of the hook and loop type fastener. Referring to FIGS. 6 and 7, the trunk flap 60 and the trunk-end connector 58 have a combined thickness T1 such that the trunk panel 24 can be closed unobstructively thereupon. In addition, the at least one trunk-end connector 58 includes a strap 62 extending from the trunk flap 60. While the internal surface 74 is described as comprising the loop part of the hook and loop type fastener, the present invention is not limited in this regard as mating part of the fastener including the loop part of a hook and loop type fastener can be secured to the internal surface 74.

Referring to FIG. 7, the trunk-end connector 58 is selectively positionable to fit the first segment 12 to the motor vehicle. Similarly, the trunk-end connector is selectively positionable to fit the second segment 14 to the motor vehicle. The trunk-end connector 58 is shown in a retracted position wherein the entire length L of the trunk flap 60 is positioned within the trunk cavity 64 to fit the first and second segments to the motor vehicle 16. At least one of the trunk-end connector 58 and the strap 62 are removably secured to the internal surface 74.

Figure 8:
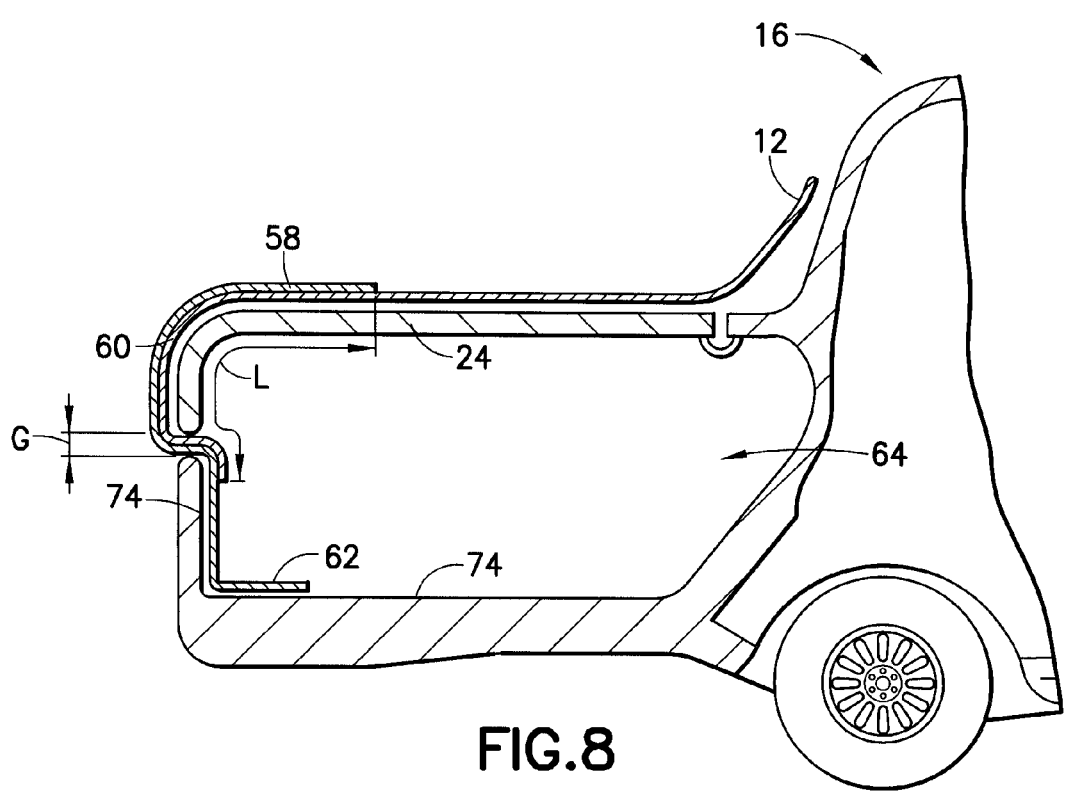
FIG. 8 is a cross sectional view of the segment installed in an extended position in the trunk of a motor vehicle.

Referring now to FIG. 8, the trunk-end connector 58 is shown in an extended position wherein a substantial portion of the length L of the trunk flap 60 is positioned outside the trunk cavity 64 to fit the first and second segments 12, 14 to a longer motor vehicle. At least one portion of the trunk-end connectors 58 and the strap 62 are removably secured to the internal surface 74.

Figure 12:
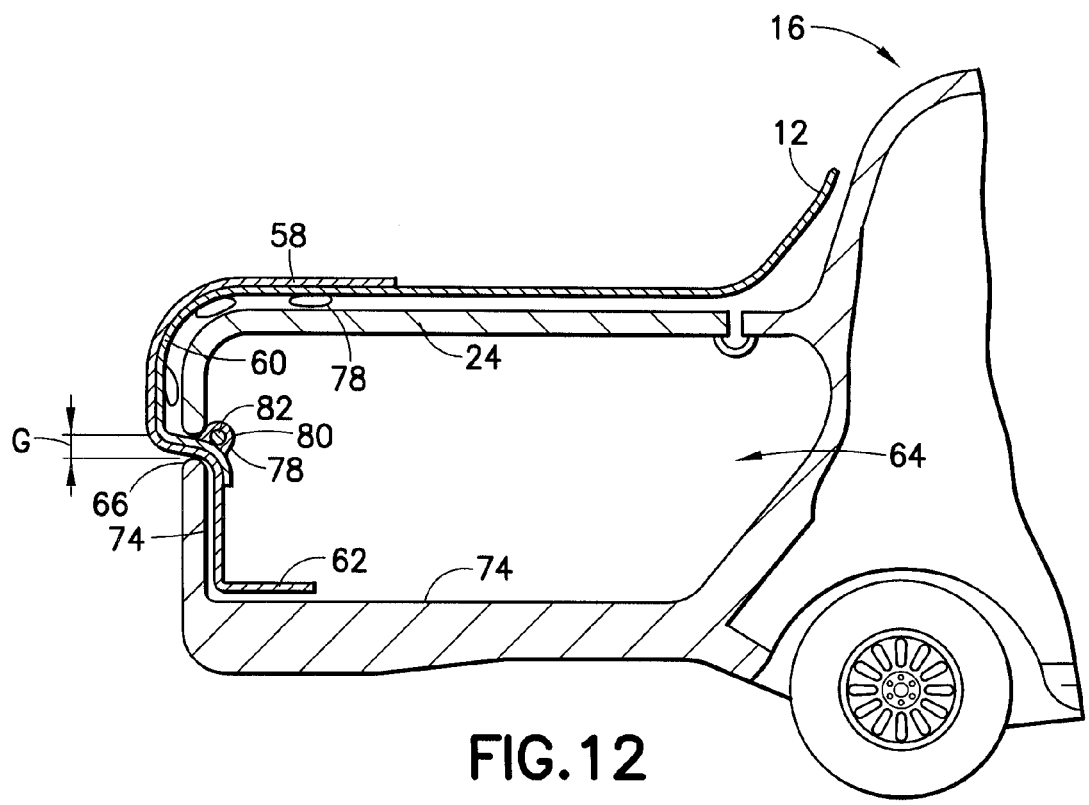
FIG. 12 is a cross sectional view of segment having pockets installed in an extended position in the trunk of a motor vehicle.

While FIG. 7 illustrates the trunk-end connector 58 positioned to fully retract at least one of the first and second segments 12, 14 and FIG. 12 illustrates the trunk-end connector 58 positioned to extend at least one of the first and second segments 12, 14, the present invention is not limited in this regard as the trunk-end connector 58 can be secured in an intermediate position to extend or retract the first and second segments 12, 14 accordingly. The first and second segments can therefore be adjusted to fit motor vehicles of various sizes.

Figure 9:
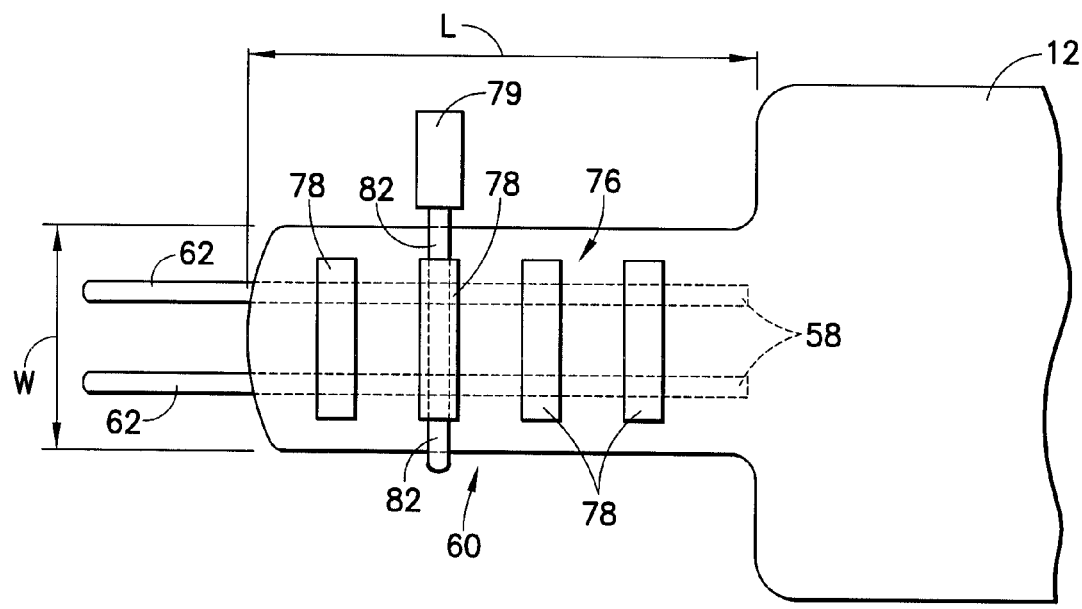
FIG. 9 is top view of a trunk flap comprising pockets.
Figure 10:
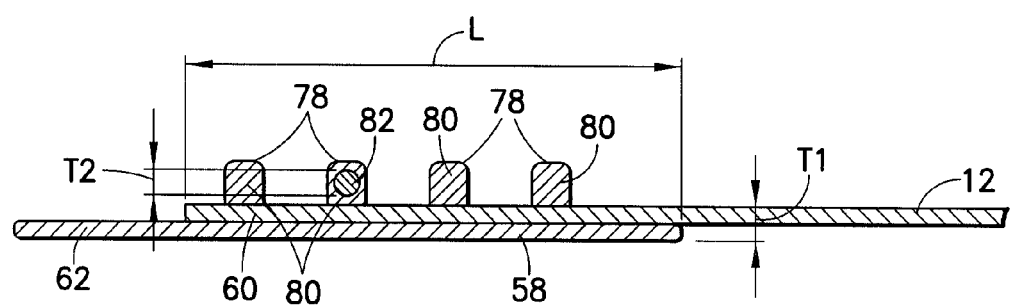
FIG. 10 is a cross sectional view of the portion of the segment illustrated in FIG. 9.

Referring to FIGS. 9-10, the first and second segments 12, 14 are configured similar to that described above for a previous embodiment. In the present embodiment, at least one of the first and second segments 12, 14 further include an anchor 76 comprising a plurality of transversely extending appendages 78 affixed to the trunk flap 60 and a plug 82. The plurality of appendages 78 form a plurality of pockets 80 configured to removably secure the plug 82 therein. The appendages 78 are preferably fabricated from a pliable material similar to that described above for the protective cover. The plug 82 is shown connected to a motor 79 to facilitate removal of the protective cover 10 from the motor vehicle. The plug 82 is secured to one of the appendages 78 and to a shaft of the motor 82 such that when the shaft of the motor rotates the plug rotates along a longitudinal axis thereof and the trunk flap 60 and the remainder of the protective cover, become wound around a longitudinal axis of the plug. While a motor 82 is described for rotating the plug 82 other devices can also be used to rotate the plug such as but not limited to torsion springs.

Figure 11:
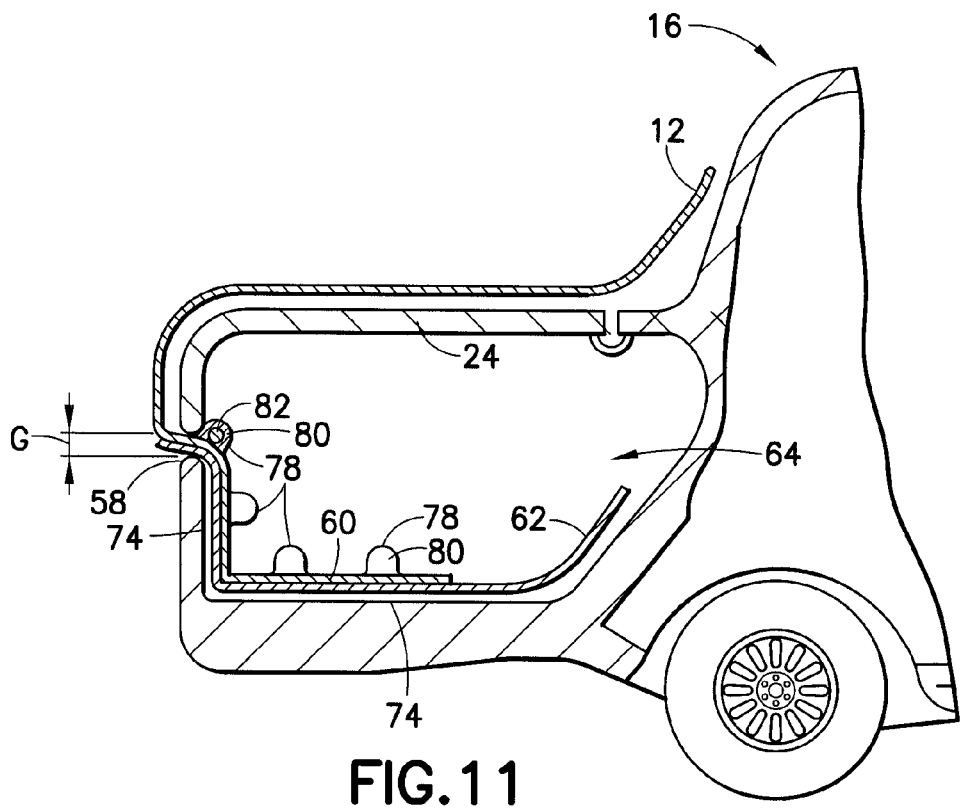
FIG. 11 is a cross sectional view of the segment having pockets installed in a retracted position in the trunk of a motor vehicle

Referring now to FIGS. 10-12, the plug 82 has a thickness T2 to prevent the anchor 76 from being withdrawn through a gap G between the trunk panel 24 and the trunk frame 66 when the trunk panel is closed upon the trunk flap 60. The plug 82 is selectively positioned in one of the pockets 80 of at least one of the first and second segments 12, 14 to adjust the protective cover 10 to fit the motor vehicle 16. The use of the anchor 76 secures the protective cover 10 to the motor vehicle 16 thereby helping discourage theft of the protective cover. Although the trunk-end 60 is shown secured into the trunk cavity 64, the present invention is not limited in this regard as the trunk flap can be secured to other portions of the motor vehicle, including but not limited to diametrically opposing trunk quadrants, diametrically opposing wheel wells, wheels, windows, doors or other suitable locations.

Referring to FIG. 11, the trunk-end connector 58 is selectively positionable to fit at least one of the first and second segments 12, 14 to the motor vehicle 16. The trunk-end connector 58 is shown in a retracted position wherein a substantial portion of the trunk flap 60 and all of the pockets 80 are positioned within the trunk cavity 64 to fit the first and second segments to the motor vehicle 16. The plug 82 is positioned in the pocket 80 to anchor a length of the trunk flap into the trunk cavity 64 suitable to fit at least one of the first and second segments 12, 14 to the motor vehicle 16. In particular, the pocket 80 having the plug 82 secured therein is shown abutting the trunk panel 24 and the trunk frame 66 in the area of the gap G thereby preventing the trunk flap from being further withdrawn from the trunk cavity 64. At least one of the trunk-end connector 58 and the strap 62 are removably secured to the internal surface 74.

Referring now to FIG. 12, the trunk-end connector 58 is shown in an extended position wherein a substantial portion of the trunk flap 60 and all except one of the pockets 80 are positioned outside the trunk cavity 64. The pockets 80 positioned outside of the trunk cavity 64 collapse between the trunk panel 24 and the trunk flap when the trunk flap is installed. The plug 82 is removably secured in the pocket 76 positioned within the trunk cavity 64 to anchor a length of the trunk flap 60 into the trunk cavity 64 suitable to fit at least one of the first and second segments 12, 14 to a longer motor vehicle 16. The pocket 80 having the plug 82 secured therein is shown abutting the trunk panel 24 and the trunk frame 66 in the area of the gap G thereby preventing the trunk flap from being further withdrawn from the trunk cavity 64. At least one portion of the trunk-end connectors 58 and the strap 62 are removably secured to the internal surface 74.

While FIG. 11 illustrates the plug 82 being removably positioned in the pocket 80 to fully retract at least one of the first and second segments 12, 14 and FIG. 12 illustrates the plug being removably positioned in another of the pockets to fully extend at least one of the first and second segments 12, 14, the present invention is not limited in this regard. For example the plug 82 can be removably positioned in any other pocket 76 to extend or retract the first and second segments 12, 14 to an intermediate position between the fully extended and retracted positions. The first and second segments can therefore be adjusted to fit motor vehicles of various sizes. In addition, the appendages 78 can be of a thickness to prevent the anchor 76 from being withdrawn through a gap G between the trunk panel 24 and the trunk frame 66 when the trunk panel is closed upon the trunk flap 60 without the use of the plug 82.

Figure 13:
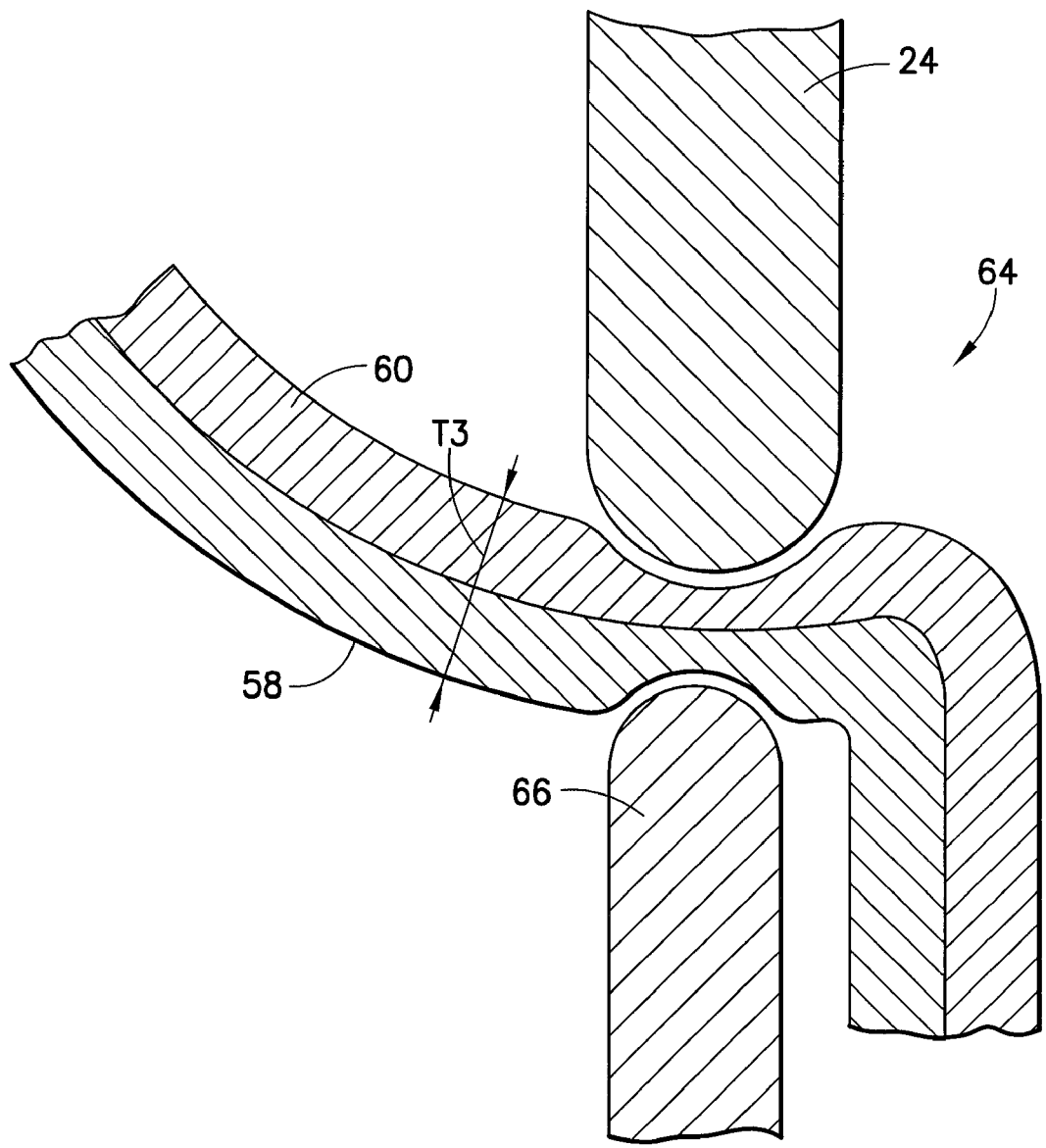
FIG. 13 is a cross sectional view of a portion of a trunk flap and trunk-end connector secured in the trunk cavity.

Referring to FIG. 13, the trunk flap 60 and the trunk-end connector 58 have a combined thickness T3 such that when the trunk panel 24 is closed, the trunk flap and the trunk-end connector are compressed and thereby secured between the trunk panel and the trunk frame 66.

Figure 14:
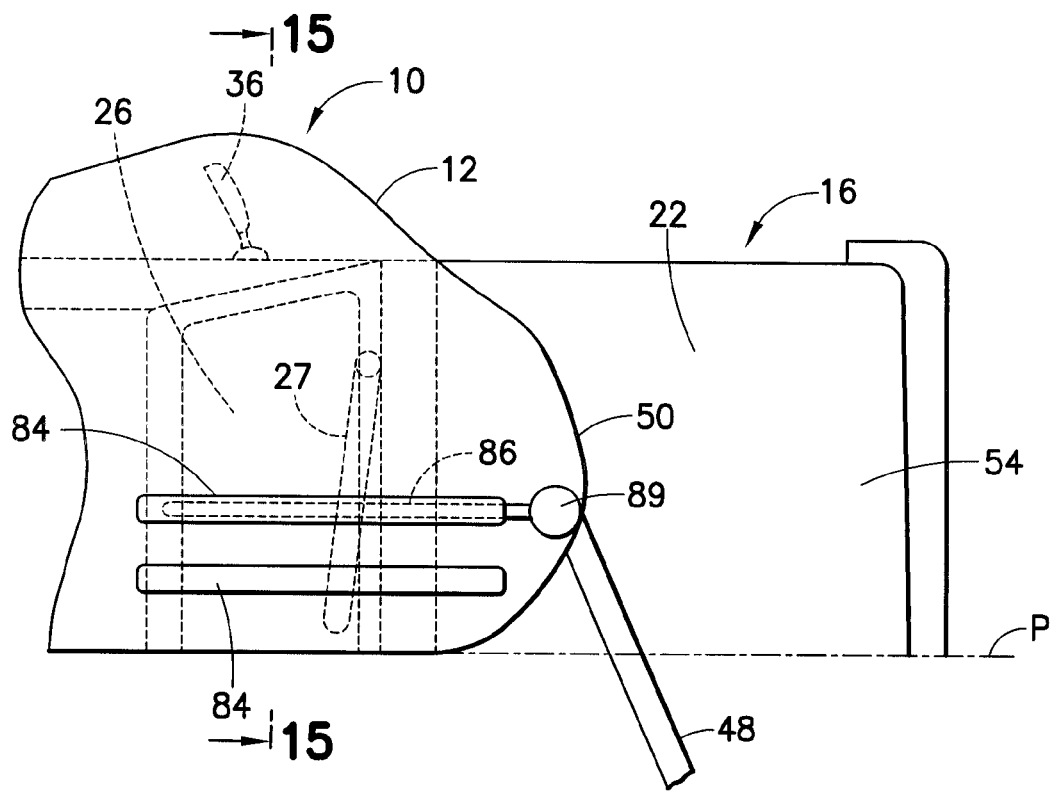
FIG. 14 is a top view of a portion of the protective cover positioned on a hood quadrant.
Figure 15:
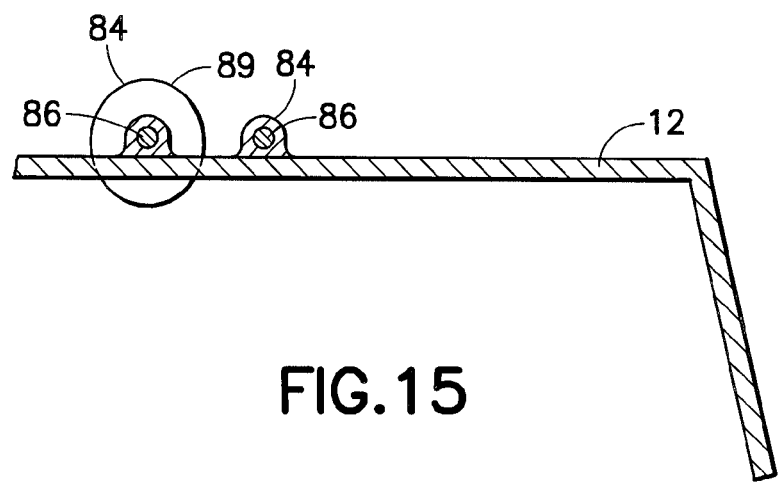
FIG. 15 is a cross sectional view of the portion of the protective cover of FIG. 14.

Referring now to FIGS. 14 and 15, at least one of the first and second segments 12, 14 include at least one compartment 84 having the stiffener 86 disposed therein for helping extend portions of the first and second segments into position on respective portions of the first and second external surfaces; helping the first and second segments 12, 14 from being blown around by the wind; and maintaining the first and second segments firmly in place and properly positioned on selective portions of the motor vehicle. Preferably the stiffener 86 is comprised of an elastically deformable material and the pocket is fabricated from a pliable material similar to that described above for the protective cover. The compartment 84 is aligned substantially parallel to the reference plane P and disposed on at least one of the first and second segments 12, 14 in a position over the windshield 26 and the windshield wipers 27. Although the compartment 84 is shown aligned substantially parallel to the reference plane P, the present invention is not limited in this regard as the pocket can be aligned in any orientation suitable to maintain the at least one of the first and second segments 12, 14 in the position over the windshield 24, the windshield wiper 27 and other portions of the motor vehicle. The stiffener 86 can also be used to roll the respective segment 12, 14 thereon to remove the protective cover 10 from the motor vehicle 16 and for unrolling the respective segment therefrom to install the protective cover on the motor vehicle. The stiffener 86 can be coupled to power driven mechanism such a motor 89 to facilitate removal of the protective cover.

Figure 16:
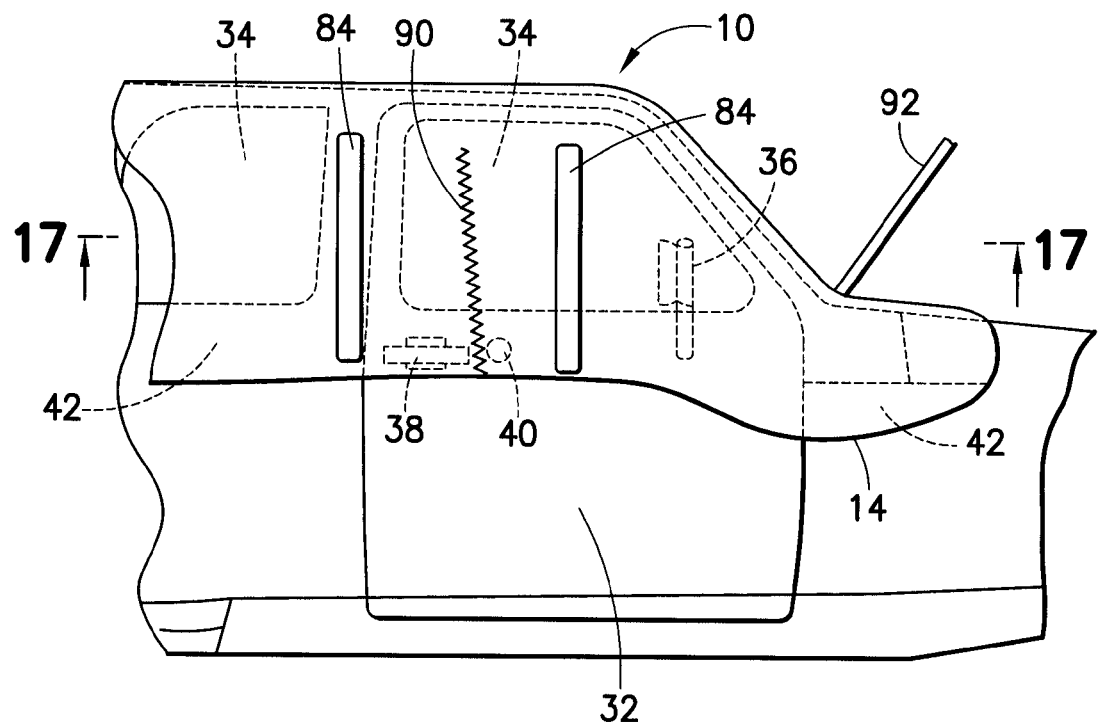
FIG. 16 is a side view of a portion of the protective cover positioned over a door.
Figure 17:
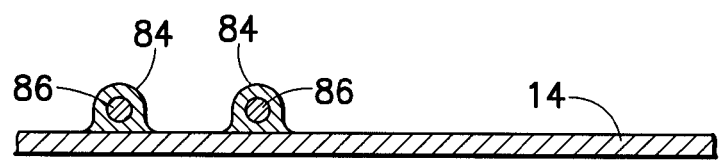
FIG. 17 is a cross sectional view of the portion of the protective cover of FIG. 16.

Referring to FIGS. 16 and 17, at least one of the first and second segments 12, 14 include at least one compartment 84 having a stiffener 86 disposed therein for maintaining at least one of the first and second segments 12, 14 in a position over the lateral windows 34, the door handle 38, the lock 40, and portions of the side door 32 and side panels 42. At least one of the first and second segments 12, 14 include at least one resealable access 90. Preferably, the resealable access 90 comprises a hook and loop type fastener and is positioned on at least one of the first and second segments 12, 14 to allow opening of the side door 32 of the motor vehicle 16. In addition, at least one appendage 92 is positioned on at least one of the first and second segments 12, 14 for access thereto during removal and installation thereof. Preferably, the appendage 92 comprises a flexible rod projecting substantially perpendicular to and outwardly from a surface of the first and second segments 12, 14 to allow visibility thereof when snow or ice are accumulated thereon.

While the stiffeners 86 are shown being secured to the respective segments 12, 14 in a compartment 84, the present invention is not limited in this regard the stiffeners can be secured to the segments using other devices including but not limited to adhesives, stitching, hook and loop fasteners, and the stiffeners may be integral to the segments.

While the resealable access 90 is shown to allow opening of the side door 32, resealable accesses can be positioned on other portions of the first and second segments to provide access to other portions of the motor vehicle such as, but not limited to a license plate, the trunk cavity 64, lateral windows 34, the door handle 38, and the lock 40. Although the resealable access is described having hook and loop type fasteners, the present invention is not limited in this regard, as other types of fasteners including, but not limited to snaps, ties, zippers and hooks, can also be used. While, the appendage 92 shown comprises a flexible rod projecting substantially perpendicular to and outwardly from a surface of the first and second segments 12, 14, the present invention is not limited in this regard as other appendages can be used including, but not limited to, lanyards, straps, dowels, extension arms, and flexible or rigid poles.

Figure 18:
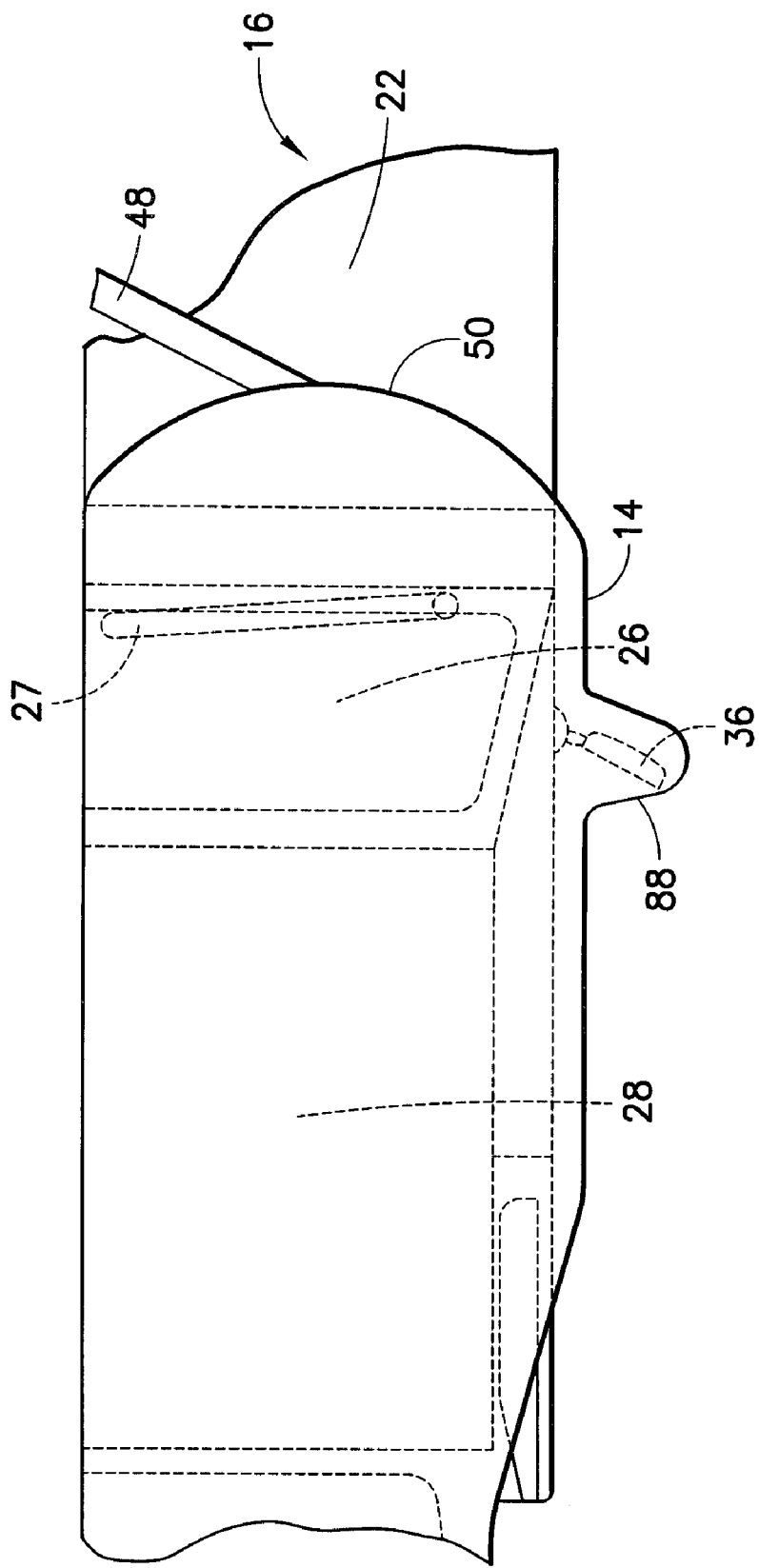
FIG. 18 is a side view of a portion of the protective cover illustrating a recess disposed therein.

Referring to FIG. 18, at least one of the first and second segments 12, 14 include a recess 88 formed thereon. The recess 88 is configured to receive the side mirror 36 projecting from the motor vehicle 16 for anchoring at least one of the first and second segments 12, 14 to the motor vehicle 16. Use of the side mirror 36 as an anchor point for the recess 88 facilitates installation and removal of the protective cover 10. The side mirror 36 applies equal and opposite reaction forces on the respective segment 12, 14 in response to forces applied thereto by securing the hood-end connector 48 to the diametrically opposing hood quadrant 52, 54. The side mirror 36 also applies equal and opposite reaction forces on the respective segment 12, 14 in response to forces applied thereto by securing the trunk flap 60 in the trunk cavity 64.

Referring now to FIG. 19, the protective cover 10 includes at least one additional segment 94, 96. Preferably, the at least one additional segment 94, 96 is releasably coupled to one of the first and second segments 12, 14. Preferably, the at least one additional segment 94, 96 and at least one of the first and second segments include a hook and loop type fastener 98 for releasably coupling the at least one additional segment to one of the first and second segments 12, 14. Although hook and loop type fasteners have been described, the present invention is not limited in this regard, as other types of fasteners including, but not limited to snaps, ties, zippers and hooks, can also be used.

The present invention includes a method of using the protective cover 10. The method using the protective cover 10 includes the first step of providing the first segment 12 comprising a pliable material configured to cover at least a portion of a first external surface of a motor vehicle 16 disposed substantially on one side of a reference plane P centrally positioned between two opposing lateral sides S1, S2 of the motor vehicle and extending between the front end 23 and the rear end 25; the second segment 14 comprising a pliable material configured to cover at least a portion of a second external surface of a motor vehicle 16 disposed substantially on an opposing side of the reference plane P and extending between the front end 23 and the rear end 25; the first and second segments 12, 14 each comprising at least one hood-end connector 48 projecting from a hood-end 50 thereof towards a diametrically opposing hood quadrant 52, 54; each of the first and second segments having a trunk flap 60 extending therefrom; and the trunk flaps having at least one trunk-end connector 58 affixed thereto.

The method also includes the steps of positioning the trunk flap 60 into the trunk cavity 64 to fit the first segment 12, 14 to the motor vehicle 16, securing the trunk-end connector 58 to a internal surface 74 of the trunk cavity 64, removing the remainder of the segment from the trunk cavity, extending the segment over the external surface and securing the hood-end connector 48 to a diametrically opposing hood quadrant 52, 54. The method further includes positioning the trunk flap 60 into the trunk cavity 64 to fit the second segment 12, 14 to the motor vehicle 16, securing the trunk-end connector 58 to a internal surface 74 of the trunk cavity 64, removing the remainder of the segment from the trunk cavity, closing the trunk panel onto a portion of the first segment and the second segment, extending the second segment over the second external surface and securing the hood-end connector 48 to a diametrically opposing hood quadrant 52, 54.

The method further includes the steps of releasing the hood-end connector 48 of the second segment from the opposing hood quadrant 52, 54, retracting the second segment 14 from the second external surface, releasing the hood-end connector 48 of the first segment from the opposing hood quadrant 52, 54, retracting the first segment 14 from the first external surface, opening the trunk panel 24, releasing the trunk-end connectors from the internal surface 74. While the method of installing and removing the protective cover described comprise manual efforts, the present invention is not limited in this regard as power driven devices such as but not limited to motors and torsions springs are also within the scope of the present invention.

Although the present invention has been disclosed and described with reference to certain embodiments thereof, it should be noted that other variations and modifications may be made, and it is intended that the following claims cover the variations and modifications within the true scope of the invention.

What is claimed is:

1. A protective cover for a motor vehicle comprising:
   a first segment comprising a pliable material configured to cover at least a portion of a first external surface of the motor vehicle, wherein the first external surface is disposed substantially on a first side of a reference plane centrally positioned between two opposing lateral sides of the motor vehicle and extending between a front end and a rear end of the motor vehicle;
   a second segment comprising a pliable material configured to cover at least a portion of a second external surface of the motor vehicle, wherein the second external surface is disposed substantially on a second side of the reference plane and extending between the front end and the rear end;
   said first and second segments being positioned adjacent to one another on opposing sides of the reference plane;
   wherein said first and second segments overlap one another in an area adjacent the reference plane; and
   at least one additional segment releasably coupled to one of said first and second segments.

2. The protective cover of claim 1 wherein:
   said first segment comprises at least one hood-end connector projecting from a hood-end of said first segment towards a first diametrically opposing hood quadrant when said first segment is installed on the first external surface; and
   said second segment comprises at least one hood-end connector projecting from the hood-end of said second segment towards a second diametrically opposing hood quadrant when said second segment is installed on the second external surface.

3. The protective cover of claim 2 wherein
   at least one hood-end connector of said first segment and said at least one hood-end connector of said second segment intersect each other along longitudinal axes.

4. The protective cover of claim 3 wherein a releasable fastener is affixed to a distal end of at least one of said hood-end connectors.

5. The protective cover of claim 3 wherein said hood-end connector comprises an elastically deformable material.

6. A protective cover for a motor vehicle comprising:
   a first segment comprising a pliable material configured to cover at least a portion of a first external surface of the motor vehicle, wherein the first external surface is disposed substantially on a first side of a reference plane centrally positioned between two opposing lateral sides of the motor vehicle and extending between a front end and a rear end of the motor vehicle;
   a second segment comprising a pliable material configured to cover at least a portion of a second external surface of the motor vehicle, wherein the second external surface is disposed substantially on a second side of the reference plane and extending between the front end and the rear end;
   said first and second segments being positioned adjacent to one another on opposing sides of the reference plane;
   at least one of said first segment and said second segment include a trunk flap extending therefrom;
   said trunk flap has at least one trunk-end connector affixed thereto;
   said trunk flap and said trunk-end connector have a combined thickness such that the trunk panel can be unobstructively closed thereupon;
   said trunk-end connector is selectively positionable to fit said at least one of said first segment and said second segment to the motor vehicle; and
   wherein said trunk-end connector is selectively positioned in the trunk cavity of the motor vehicle and removably secured to an internal surface thereof.

7. The protective cover of claim 6 wherein:
   at least one of said first and second segments include an anchor;
   said anchor comprises plurality of pockets positioned on said trunk flap of each of said first and second segments and a plug;
   said pockets are configured to removably secure said plug therein;
   said plug is configured to prevent said anchor from being withdrawn through a gap between the trunk panel and the trunk frame when the trunk panel is closed upon said trunk flap; and
   said plug is selectively positioned in one of said pockets of said at least one of said first and second segments to adjust said protective cover to fit the motor vehicle.

8. The protective cover of claim 6 wherein:
   said trunk flap and said trunk-end connector have a combined thickness such that when the trunk panel is closed, a portion of said trunk flap and said trunk-end connector are secured between the trunk panel and the trunk frame.

9. The protective cover of claim 1 wherein:
   at least one of said first and said second segments include at least one stiffener affixed thereto for installing said protective cover on and removing said protective cover from the motor vehicle and for maintaining said protective cover on the motor vehicle.

10. The protective cover of claim 9 wherein:

at least one of said stiffeners is positioned on a windshield portion of at least one of said first and said second segments to extend and maintain said at least one of said first and second segments in a position over the windshield and windshield wipers of the motor vehicle.

11. The protective cover of claim 9 wherein:

at least one of said stiffeners is positioned on a side window portion of at least one of said first and said second segments to extend and maintain said at least one of said first and second segments in position over the side window and a portion of the doors of the motor vehicle.

12. A protective cover for a motor vehicle comprising:

a first segment comprising a pliable material configured to cover at least a portion of a first external surface of the motor vehicle, wherein the first external surface is disposed substantially on a first side of a reference plane centrally positioned between two opposing lateral sides of the motor vehicle and extending between a front end and a rear end of the motor vehicle;

a second segment comprising a pliable material configured to cover at least a portion of a second external surface of the motor vehicle, wherein the second external surface is disposed substantially on a second side of the reference plane and extending between the front end and the rear end;

said first and second segments being positioned adjacent to one another on opposing sides of the reference plane;

at least one of said first and second segments include a recess formed thereon; and said recess is configured to receive a mirror projecting from the motor vehicle for anchoring said at least one of said first and second segments to the motor vehicle.

13. The protective cover of claim 12 wherein said first and second segments overlap one another in an area adjacent the reference plane.

14. The protective cover of claim 1 wherein:

at least one of said first and second segments includes a resealable opening disposed therein.

15. A protective cover for a motor vehicle comprising:

a first segment comprising a pliable material configured to cover at least a portion of a first external surface of the motor vehicle, wherein the first external surface is disposed substantially on a first side of a reference plane centrally positioned between two opposing lateral sides of the motor vehicle and extending between a front end and a rear end of the motor vehicle;

a second segment comprising a pliable material configured to cover at least a portion of a second external surface of the motor vehicle, wherein the second external surface is disposed substantially on a second side of the reference plane and extending between the front end and the rear end;

said first and second segments being positioned adjacent to one another on opposing sides of the reference plane; and at least one of said first and second segments include at least one appendage positioned on at least one of said first segment and said second segment for access thereto during installation and removal thereof.

16. A method of using a protective cover comprising the steps of:

providing a first segment and a second segment, each comprising a pliable material, said first segment is configured to cover at least a portion of a first external surface of a motor vehicle disposed substantially on one side of a reference plane centrally positioned between two opposing lateral sides of the motor vehicle and extending between a front end and a rear end of the motor vehicle; said second segment is configured to cover at least a portion of a second external surface of a motor vehicle disposed substantially on an opposing side of the reference plane and extending between the front end and the rear end; said first segment and said second segment each comprising at least one hood-end connector projecting from a hood-end thereof towards a diametrically opposing hood quadrant; said first segment and said second segment each having a trunk flap extending therefrom; and said trunk flap having at least one trunk-end connector affixed thereto;

positioning said trunk flap into the trunk cavity to fit said first segment to the motor vehicle;

securing said trunk-end connector to an internal surface of the trunk cavity;

removing the remainder of said first segment from the trunk cavity;

extending said first segment over the first external surface;

positioning said trunk flap into the trunk cavity to fit said second segment to the motor vehicle;

securing said trunk-end connector to the internal surface of the trunk cavity;

removing the remainder of said second segment from the trunk cavity;

closing the trunk panel onto a portion of said first segment and said second segment;

extending said first segment over the second external surface; and securing said hood-end connector to the diametrically opposing hood quadrant.

17. The method of claim 16 further comprising:

releasing said hood-end connector of said second segment from the opposing hood quadrant;

retracting said second segment from the second external surface;

releasing said hood-end connector of said first segment from the opposing hood quadrant;

retracting said first segment from the first external surface;

opening the trunk panel; and releasing said trunk-end connectors from the internal surface.

18. The protective cover of claim 6 wherein said first and second segments overlap one another in an area adjacent the reference plane.

* * * * *